US007896238B2

(12) United States Patent
Fein et al.

(10) Patent No.: US 7,896,238 B2
(45) Date of Patent: Mar. 1, 2011

(54) SECURED TRANSACTION USING COLOR CODED ACCOUNT IDENTIFIERS

(75) Inventors: Gene S. Fein, Lenox, MA (US);
Edward Merritt, Lenox, MA (US)

(73) Assignee: Intellectual Ventures Holding 32 LLC, Las Vegas, NV (US)

( * ) Notice: Subject to any disclaimer, the term of this patent is extended or adjusted under 35 U.S.C. 154(b) by 912 days.

(21) Appl. No.: 11/695,984

(22) Filed: Apr. 3, 2007

(65) Prior Publication Data
US 2008/0245861 A1 Oct. 9, 2008

(51) Int. Cl.
*G06K 5/00* (2006.01)
(52) U.S. Cl. ................................ 235/380; 235/379
(58) Field of Classification Search .............. 235/379, 235/380; 705/14.17, 14.18
See application file for complete search history.

(56) References Cited

U.S. PATENT DOCUMENTS

| | | | |
|---|---|---|---|
| 2,162,946 A | 6/1939 | Garrison | |
| 3,752,904 A | 8/1973 | Waterbury | |
| 5,259,649 A | 11/1993 | Shomron | |
| 5,369,261 A * | 11/1994 | Shamir | 235/469 |
| 5,517,558 A | 5/1996 | Schalk | |
| 5,585,787 A | 12/1996 | Wallerstein | |
| 5,955,961 A | 9/1999 | Wallerstein | |
| 7,225,994 B2 | 6/2007 | Finkelstein | |
| 2002/0171662 A1 * | 11/2002 | Lee | 345/593 |
| 2003/0069846 A1 * | 4/2003 | Marcon | 705/41 |
| 2003/0091204 A1 * | 5/2003 | Gibson | 381/119 |
| 2004/0030659 A1 | 2/2004 | Gueh | |
| 2004/0041026 A1 * | 3/2004 | Tani | 235/454 |
| 2006/0027662 A1 * | 2/2006 | Baradi | 235/469 |
| 2006/0119901 A1 | 6/2006 | Ehrenfeld et al. | |
| 2007/0136193 A1 | 6/2007 | Starr | |
| 2007/0188299 A1 * | 8/2007 | Blum | 340/5.25 |
| 2008/0301015 A1 * | 12/2008 | Griffin et al. | 705/33 |

OTHER PUBLICATIONS

USPTO; File History for U.S. Appl. No. 11/695,980 to Fein, filed Apr. 3, 2007.
ISO/IEC 11693:2005.
ISO/IEC 11694-6:2006.
USPTO; Office Action for U.S. Appl. No. 11/695,980; mailed Jun. 5, 2009.
Prosecution History for U.S. Appl. No. 11/695,980 filed on Apr. 3, 2007.
Stolowitz Ford Cowger LLP, Listing of Related Cases, Dec. 3, 2010.

* cited by examiner

*Primary Examiner*—Ahshik Kim
(74) *Attorney, Agent, or Firm*—Stolowitz Ford Cowger LLP

(57) ABSTRACT

A method and system provides coded access to a transactional or other type of system by acquiring account identification data corresponding to a combination of a plurality of colors. The account identification data is transmitted to, for example, a remote server to correlate the account identification data against an account database to evaluate corresponding account information. Based on the account information, access to the transactional or other type of system may be controlled.

30 Claims, 8 Drawing Sheets

CREDIT CARD FRONT

SECURED TRANSACTION USING COLOR CODED ACCOUNT IDENTIFIERS

BACKGROUND OF THE INVENTION

Credit and debit cards are widely used to conduct commerce across the globe. The current credit card system has been largely based on a coding of alphanumeric characters on the front of the card that make up the credit card account numbers, along with characters on the front and back of the cards or other security devices such as holographic stickers to provide secondary security and identification measures. Magnetic stripes on the back of cards are also a common feature. These stripes are used to encode a secure, unique digital data sequence that is read by the electronic magnetic card reader stripe swiping system and used to validate the card at manned and automated retail checkout counters. In utilizing these basic systems, as well as other systems, the credit card business has enjoyed a business that has grown in size each year with hundreds of billions of dollars spent by consumers with credit and debit cards each year.

The current system for coding and verifying credit card accounts and corresponding security checks is well established. For transactions occurring over the phone, or for online transactions, credit card users often input both their primary card account number, as well as, a secondary account number and an expiration date. Additionally, card account holders may be asked to input their address and sometimes even personal pin numbers. In some cases, they may be asked to answer a personal question stored by the card company, such as the name of their "favorite pet" or their "mother-in-law."

Conventional models address the need to create unique account numbers, and to provide other means to verify those account numbers and their corresponding users. These other means include the use of an expiration date or security code printed on the front and back of a card, or the use of a magnetic stripe holding programmed information. The magnetic stripe is an institutionalized technology in the credit and debit card industry. Today financial cards all follow the ISO standards to ensure read reliability world wide and along with transit cards constitute the largest users of magnetic stripe cards.

The magnetic stripe is written and read in much the same way that audio recording tape is written and read, except that the data are binary digits—1s and 0s—instead of sounds. The magnetic stripe is made of a material that can be magnetized. To write data onto the stripe, the card is dragged over a tiny electromagnet. Pulses of electrical current are pushed through the electromagnet windings in one direction or the other, to magnetize tiny spots on the stripe material. Perhaps one direction of magnetization represents a "1", while the opposite direction represents a "0"; but more likely a slightly more complicated system is used. Companies that deal with these cards have agreed among themselves how to use arrangements of 1s and 0s to represent the letters and numbers that they want to store on the stripe.

To read the data, the card is dragged over a tiny coil of wire. Movement of the magnetized spots past the coil causes small electrical voltages to appear in the coil, and from these voltages the stored 1s and 0s can be deduced. In practice, the coil used to read the stripe is very similar to the electromagnet used to write the stripe. These electromagnets are mounted in "write heads" and "read heads", which typically hold not one but several electromagnets, side by side, so that several "tracks" of magnetized spots are written and read simultaneously.

A standard card employing a magnetic stripe may have any of three tracks, or a combination of these tracks. Track 1 was the first track standardized. This layout was developed by the International Air Transportation Association (IATA) and is still reserved for their use. The layout includes 210 bits per inch ("bpi"), meaning the number or 0s or 1s that one head can write on each inch of stripe, with room for 79 numeric characters. It includes the primary account number (up to 18 digits) and the account holder's name (up to 26 alphanumeric characters).

Track 2 was developed by the American Bankers Association (ABA) for on-line financial transactions. This layout includes 75 bpi with room for 40 numeric characters. It includes the account number (up to 19 digits).

Track 3 is also used for financial transactions. The difference is its read/write ability. The layout includes 210 bpi with room for 107 numeric digits. It also includes an enciphered PIN, country code, currency units, amount authorized, subsidiary account information and other restrictions.

Instead of, or in addition to simply using magnetic stripes that store data, cards may also contain microcontrollers that store data and run programs. These "smartcards" contain an internal microcontroller that runs a program as soon as it is inserted in a smartcard socket. The firmware running in the smartcard is an interpreter with a passive nature, which means that instead of initiating its own actions, it merely responds in a predetermined way to commands sent in from the outside world. Furthermore, like most modern microcontrollers, its program memory can be locked so that it can be neither examined nor modified by any external means. Smartcards generally contain encryption routines built in their firmware. The combination of the three aforementioned characteristics makes these devices particularly well suited for applications requiring high security.

Furthermore, another security measure includes the use of optical memory cards. Optical memory cards use a technology similar to the one used with music CDs or CD ROMs. A panel of the "gold colored" laser sensitive material is laminated in the card and is used to store the information. The material is comprised of several layers that react when a laser light is directed at them. The laser burns a tiny hole (2.25 microns in diameter) in the material which can then be sensed by a low power laser during the read cycle. The presence or absence of the burn spot indicates a "one" or a "zero." Because the material is actually burned during the write cycle, the media is a write once read many (WORM) media and the data is non volatile (not lost when power is removed).

Optical cards can currently store between 4 and 6.6 MB of data which gives the ability to store graphical images (e.g. photographs, logos, fingerprints, x-rays, etc.). The data is encoded in a linear x-y format. ISO/IEC 11693 and 11694 standards provide details regarding the encoding format. The primary users of optical technology today are: the medical and healthcare industry; prepaid debit cards; cargo manifests; admission pass season tickets; auto maintenance records; and retail purchase cards and RFID embedded chips to help ensure security, validity and proper use of the credit or debit cards.

SUMMARY OF THE INVENTION

Unfortunately, the existing conventional systems have certain limitations in use and deployment. To start with, an alphanumeric system has certain base limitations due to the number of total characters in use that make up the combination of numbers or letters in an account number. For instance, an alphanumeric character set that includes 36 total characters has exponentially fewer possible combinations than an identification set that includes millions of possible characters. As credit cards suffer billions of dollars per year in fraud and piracy, the idea of extending the number of characters that make up account numbers and security codes may be one way to reduce fraud and piracy.

The magnetic stripe and database elements in the credit card business used as the primary methods to corroborate automatic data collection and identification for credit and debit card users are also long established systems that create few barriers to imposters. Similarly, although the implementation of security measures such as RFID and microprocessor implementation within cards certainly help the situation, these uses are only safeguards against specific types of uses, namely retail transactions, either manned or unmanned. Magnetic stripes, microprocessors and RFID chips installed within credit cards do nothing to stem the flow of online, mail/courier or phone transactions as the magnetic stripes, microprocessor or RFID chip need to be deployed locally to validate the card further.

The existing credit card system, including the basic account number system, has been in place for decades. As a consistent and single platform for the credit and debit card industry, it has also been susceptible for fraudulent attack precisely because it provides an established target to focus upon to find solutions to hack the credit card systems in a variety of ways.

Accordingly, there is a need for a new, integrated system that replaces the well established way to create and code credit cards and debit cards. The new system integrates newer methods into the coding of credit card and debit card accounts, and combines those methods with newer available security measures within the card. The external innovations of this system include redefining the basic database coding elements and programming structure that processes, verifies, communicates and houses credit card data. This system will create the flexibility to define many more account code combinations in a manner that leaves the vast majority of possible account code combinations unused. As the security measures and increased card code combinations of the system are used in tandem, the credit card system as a whole becomes less susceptible to fraud and abuse. Further, the data will be transported by the reader systems in a way that is entirely new, low cost, built in order to add on to existing standards and ensures a higher degree of accuracy and fraud protection while guarding against misuse.

The present invention relates to the creation of a credit, debit or security code system that uses colors as unique sequenced account identifiers where a match is then sought by the system between the colors and other corresponding data transmissions to make secure account verifications from central and sub-central data and data verification points. According to principles of the present invention, a method and corresponding system provides coded access to a system by acquiring account identification data corresponding to a combination of a plurality of colors. The account identification data is transmitted to a remote server to correlate the account identification data against an account database to evaluate corresponding account information. Based on the account information, access to the system may be controlled. The combination of a plurality of colors may be a combination of twelve color arrays and/or may be selected from a range of many thousand to millions of individual colors

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

According to principals of the present invention, a system may use the millions of potential colors in the color spectrum as available individual coding elements deployed in combination to create a new transactional account management system, such as a credit card, debit card, or gift card system. The colors may be used to create account identification data, account codes, or what is currently referred to as credit or debit card 'account numbers.'

Figure 1:
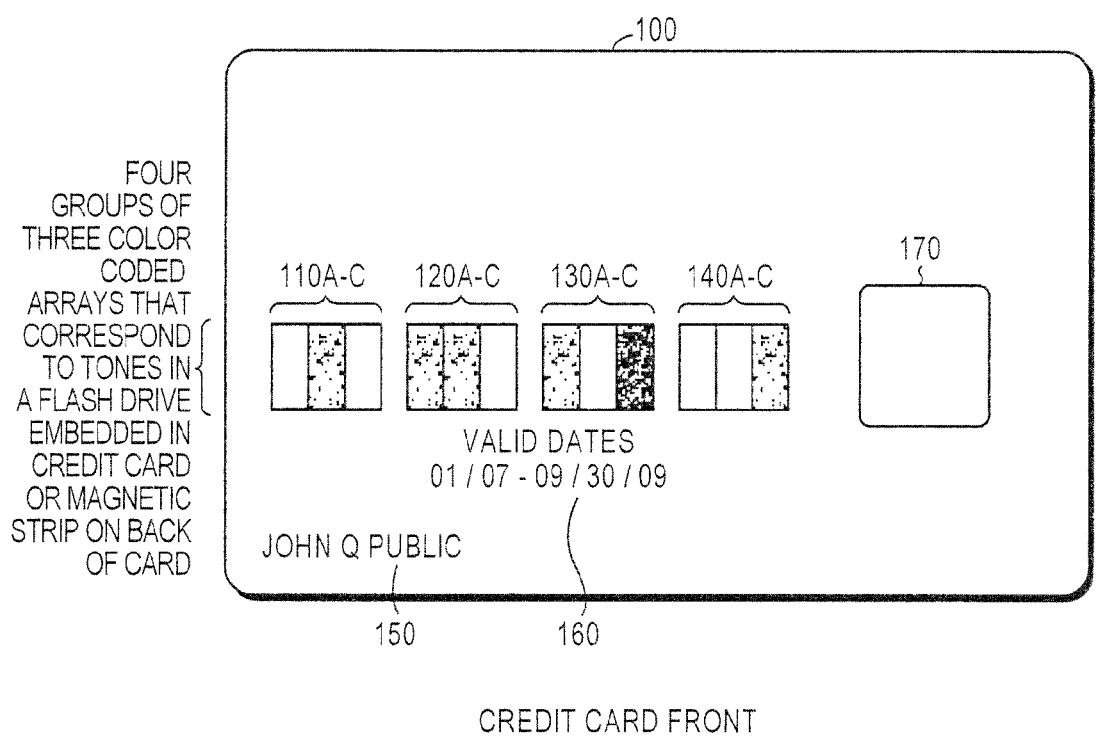
FIG. 1 is a schematic view of the front of a card that may be used in systems according to principles of the present invention.

The front of the cards used in systems according to principles of the present invention are aesthetically pleasing. FIG. 1 illustrates the front of a card 100 that may be used in a system according to principles of the present invention. Typically, a string or series of numerals (written digits) represents the credit or debit card account number. These numerals (digits) may be removed completely from the card. Instead, the numerals may be replaced by a pleasant grouping of colors. The individual colors used in the system, perhaps over 10,000,000 individual colors, may be stored in a database correlating to an individual name, such as "aqua" or "periwinkle" and used in the system as a combination on the credit and debit cards to create individual cardholder account numbers.

In the embodiment shown in FIG. 1, the combination of a plurality of colors is a combination of twelve color arrays, or color swatches. For organizational purposes, the twelve arrays have been arranged in four groups of three color coded arrays 110A-C, 120A-C, 130A-C, and 140A-C. As in typical credit or debit card systems, the front of the card displays the authorized user (account holder) name 150, along with the expiration date 160. In addition to card coding in color, auxiliary coding for security may also exist, such as a 4-color, quick security code element (not shown in FIG. 1). This may be used in tandem with holographic watermarks 170 and other combinations of security measures already existing in the art.

Figure 2:
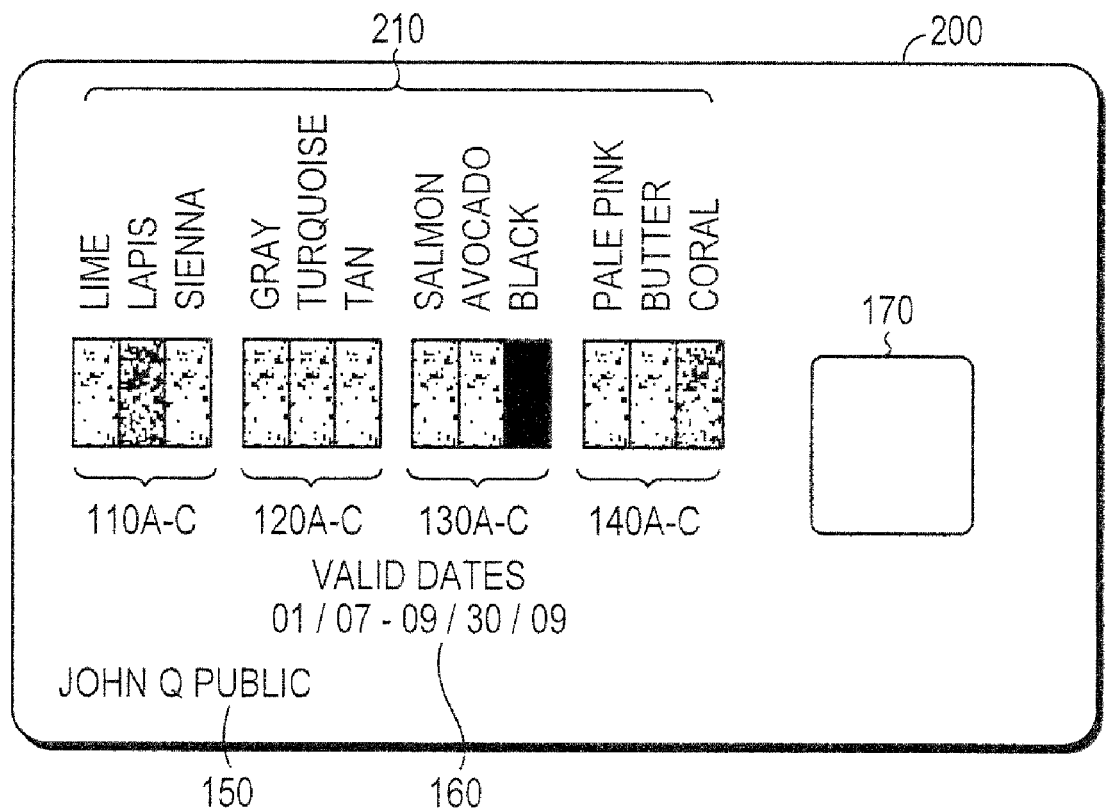
FIG. 2 is a schematic view of the front of another card that may be used in systems according to principles of the present invention.

FIG. 2 illustrates the front of another card 200 that may be used in systems according to principles of the present invention. The card of FIG. 2 contains the same elements as shown in FIG. 1, but also includes each color array individually labeled 210 to provide a user with instant identification of the color hues. By providing a written description of hues, a user or vendor may more easily identify and enter the account information into the transactional system.

One of ordinary skill in the art will recognize that many different color models may be applied in accordance with principles of the present invention. For example, the color database may be comprised of colors formed using the known Red-Green-Blue color model. The RGB color model is an additive model in which red, green, and blue (often used in additive light models) are combined in various ways to reproduce other colors. The name of the model and the abbreviation 'RGB' come from the three primary colors, red, green, and blue. The RGB color model itself does not define what is meant by 'red', 'green' and 'blue', and the results of mixing them are not exact unless the exact spectral make-up of the red, green and blue primaries are defined. Colors from the RGB color model may be identified by their individual spectral makeup.

Similarly, the Cyan-Magenta-Yellow-Key (with the "key" being Black) model (CMYK) may be used for color classification. The CMYK model is a subtractive color model used in color printing. The mixture of ideal CMY colors is subtractive (cyan, magenta, and yellow printed together on white result in black). CMYK works through light absorption. The colors that are seen are from the part of light that is not absorbed. In CMYK, magenta plus yellow produces red, magenta plus cyan makes blue and cyan plus yellow generates green.

There are several industry standards in the classification of color systems, such as: Pantone, a dominant "spot" color printing system in the United States and Europe; Toyo, a common spot color system in Japan; DIC, another common Japanese spot color system originating from Dainippon Ink and Chemicals, Inc.; ANPA, a palette of 300 colors specified by the American Newspaper Publishers Association for spot color usage in newspapers. Those of ordinary skill in the art will recognize that these color classification systems, a gray scale color system, or customized and other color classification systems, may be used in connection with principles of the present invention.

Figure 3:
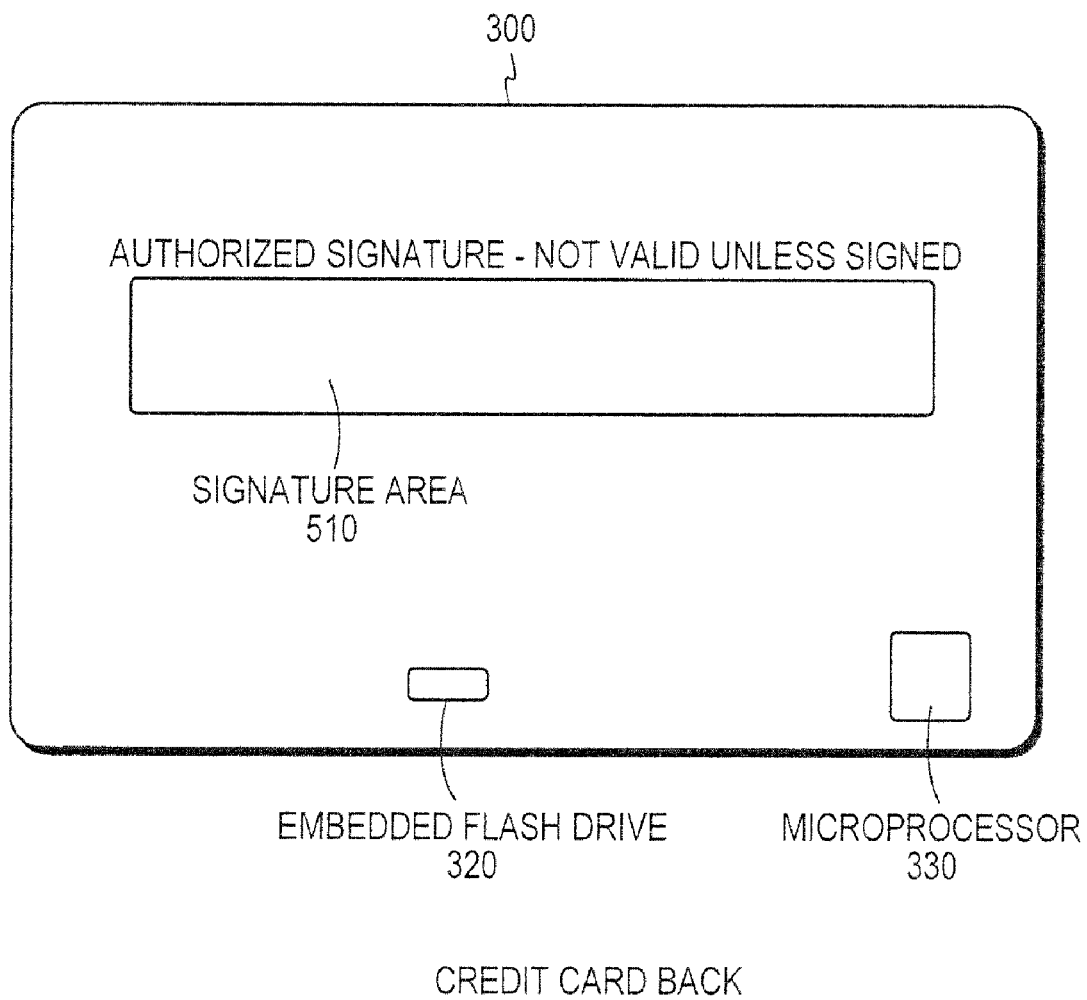
FIG. 3 is a schematic view of the back of another card that may be used in systems according to principles of the present invention.
Figure 4:
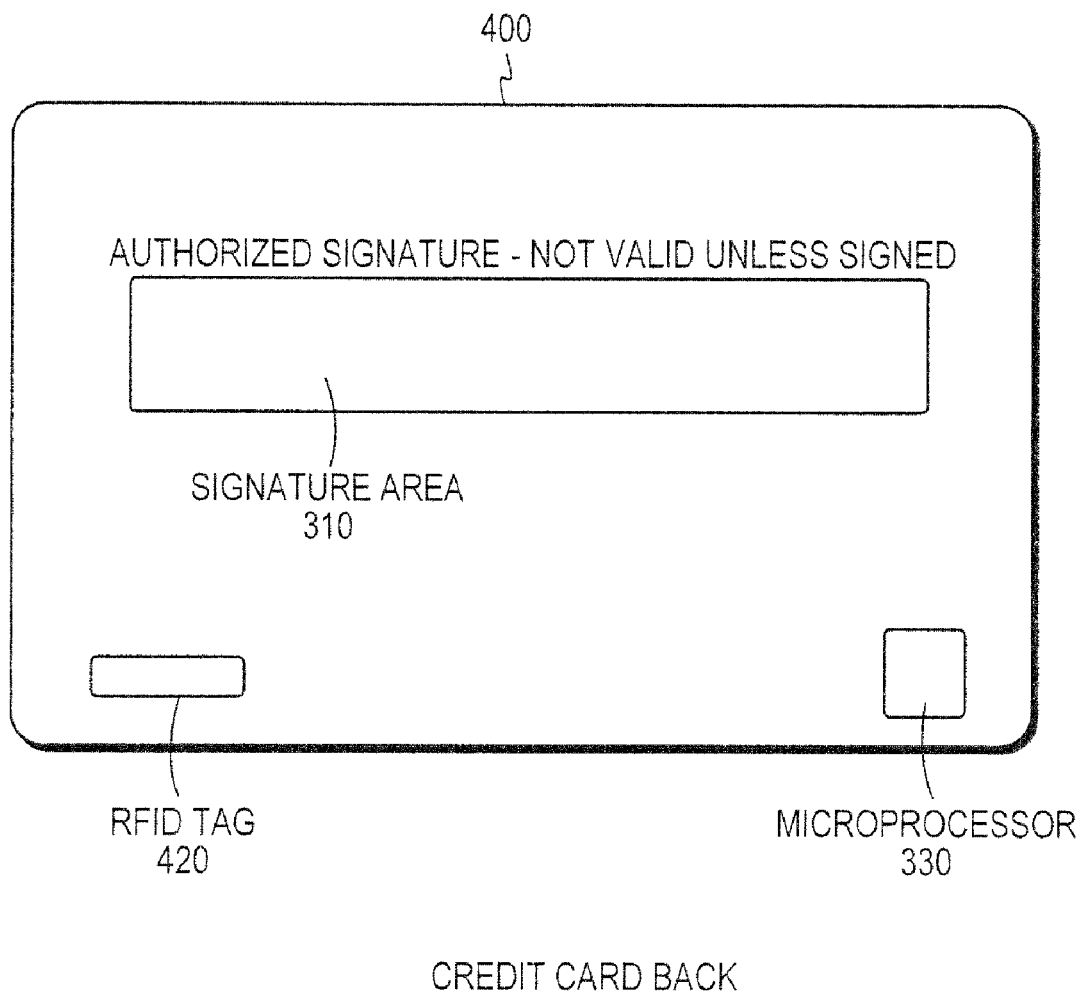
FIG. 4 is a schematic view of the back of another card that may be used in systems according to principles of the present invention.
Figure 5:
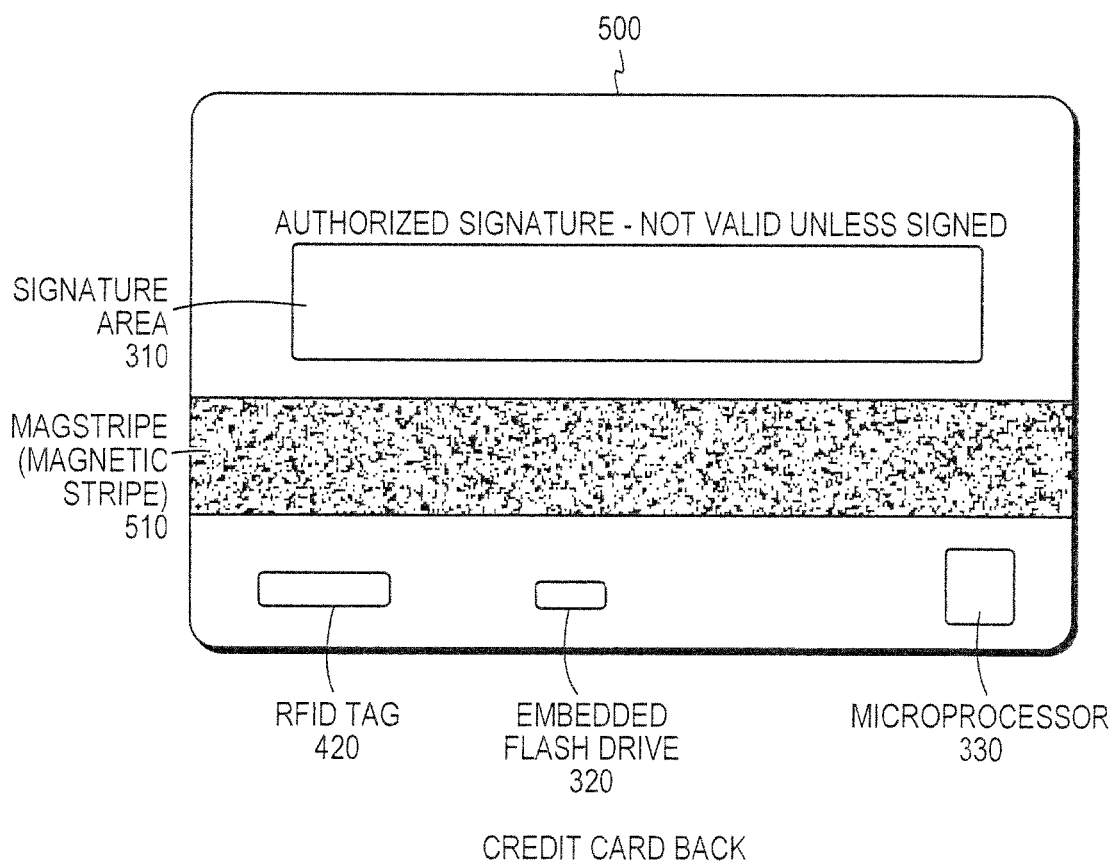
FIG. 5 is a schematic view of the back of another card that may be used in systems according to principles of the present invention.

FIGS. 3, 4 and 5 illustrate the backs of cards according to principles of the present invention. In FIG. 3, the back of a card 300 has a standard signature area 310 that provides a section for the user account holder to provide an authorized signature. In addition, the card includes an embedded flash drive 320, and a microprocessor 330. Flash drives or other non-volatile memory may hold account information corresponding to the color coded account identification data located on the front of the card. Alternatively, the flash drive 320 may store auxiliary information that provide additional security for any transaction with the card 300. In embodiments of the present invention discussed in further detail below, each individual color in the system may correspond to, or represent, an individual tone or sound that is coded in a database to create a match from the individual color to the individual tone or sound. The account identification data of a user may be stored in the flash drive 320. A microprocessor 330, such as a smart card and/or optical card processor, may be deployed within the card. This is accomplished using known techniques, such as those by Zeit Controls BasicCard or other established manufacturing processes for smart card or optical card implementation into credit or debit card configurations.

FIG. 4 illustrates the back of another card that may be used in connection with the present invention. The card 400 includes a Radio Frequency Identification (RFID) tag 420 in addition to a microprocessor 330. The RFID tag 420 may be used in connection with acquisition systems employing RFID readers.

FIG. 5 illustrates the back of a yet another card 500 that may be used in connection with the present invention. In FIG. 5, the familiar magnetic stripe 510 still holds down its customary position on the back of the card in black or brown, and may store account information along with auxiliary color codes for security purposes. As with the other devices described above, corresponding audio information may also be stored upon the magnetic stripe of the card and passed with a modified ISO compliant scanner to the verification, banking or central cardholder databases. The magnetic stripe may also function solely as is traditionally applied with magnetic stripes using the 3 sections (tracks) of data available for object code to be written onto them in a way which is completely compliant with ISO standards.

Figure 6:
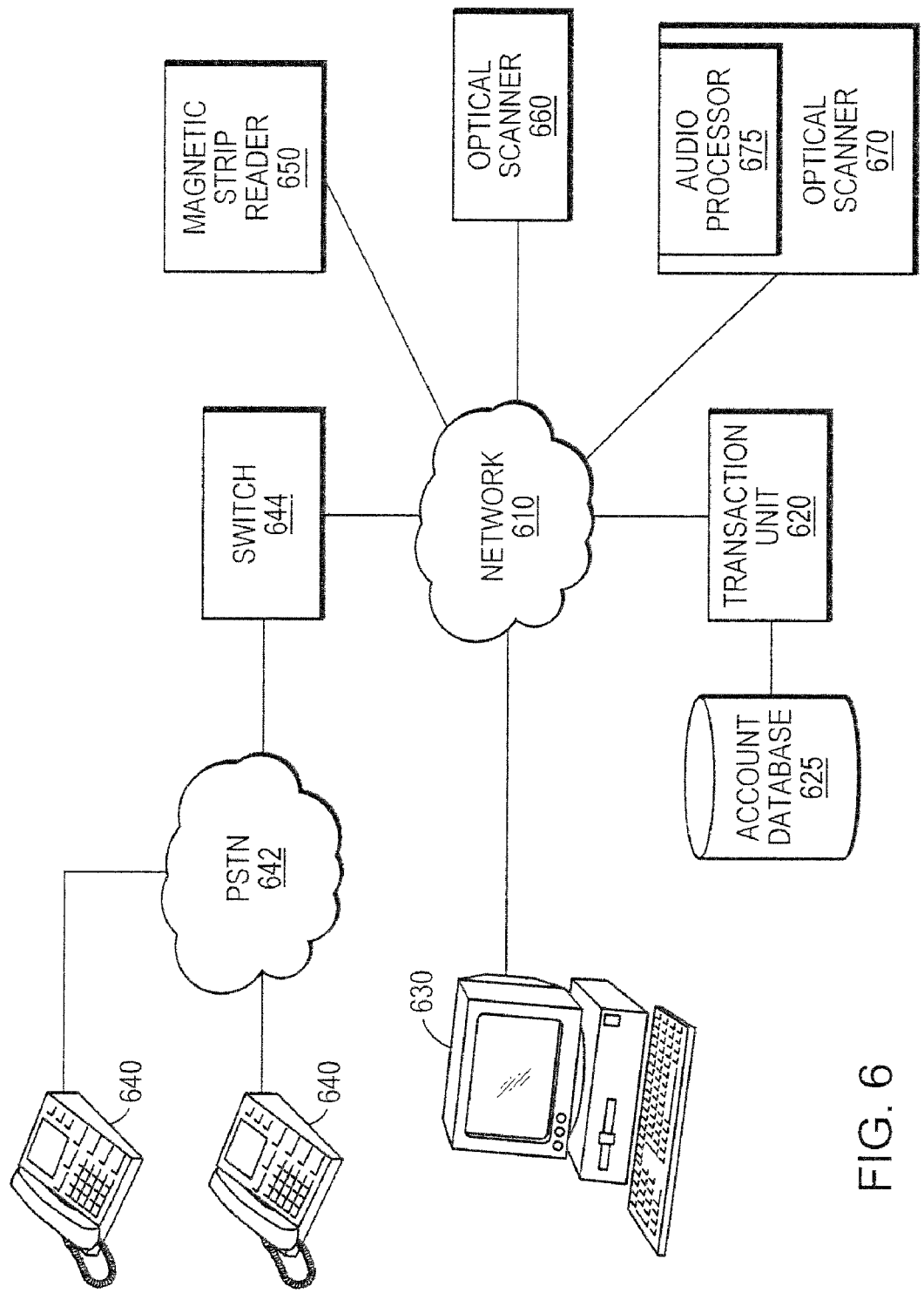
FIG. 6 is a block diagram of a system according to embodiments of the present invention.

FIG. 6 illustrates a system according to principles of the present invention. The invention method and apparatus provides coded access to a system by acquiring account identification data corresponding to a combination of a plurality of colors. In an embodiment of the present invention, an acquisition unit such as a personal computer 630, a telephone 640, magnetic strip reader 650, an optical scanner 660, or a modified optical scanner 670 provides a user access point to a network 610 for transmitting a transaction request to a transaction unit 620. The transaction unit 620 may receive a request for access to a transactional system from an acquisition unit, the request including the account identification data encoded using colors. The transaction unit 620 may also be in communication with an account database 625, either local or remote, distributed or central, or other configuration. The account database 625 may store user account information, such as account information for credit cardholders.

Each individual color may correspond to, or represent, an individual tone or sound that is coded in a database, such as account database 625 of FIG. 6, to create a match from the individual color to the individual tone or sound. In use, the individual tones or sounds are transferred to the database 625 after the sounds have been read by the system. For example, audio data comprising a series of sounds may be entered into the system from telephone 640. The sounds may be entered as "touch tone" sounds from a telephone keypad, or as voice data read by a user. The reader system can be similar to a Dragon Systems technology that allows for the reading and matched tagging of sounds, similar to how voice tags are read and then matched by a cell phone for access to stored data. The combination of read sounds is then matched in the database to corresponding colors, which are then constructed in order to yield the color combination that comprises the debit or credit card holders' account code (account number).

In other embodiments, an optical scanner 660 may acquire the series of colors from a card and using image processing techniques, discriminate between the various color hues within a color system. In yet other embodiments a specialized optical scanner 670 may similarly acquire the series of colors from a card, and convert the individual colors into a series of sounds. The sounds or tones may be stored on an optical card whose data can be transmitted by an addition 675 to ISO compliant card scanners 670 in the form of a small ROM or RAM reader and storage system. Using these sounds as account identification data, the sounds may be sent through the network and matched at the transaction unit 620 with an account database 625. One skilled in the art will recognize that the account identification comprising sounds or tones representing each color may be stored on a smart card processor, which can hold this data along with other important data. The scanner may then utilize the readers' modem connection to pass on this information to the database.

One skilled in the art will recognize that the system shown in FIG. 6 illustrates a high level network, and that consistent with principles of the present invention, data transmissions for secure account verifications may be made in other network configurations at central and sub-central data and data verification points.

Figure 7:
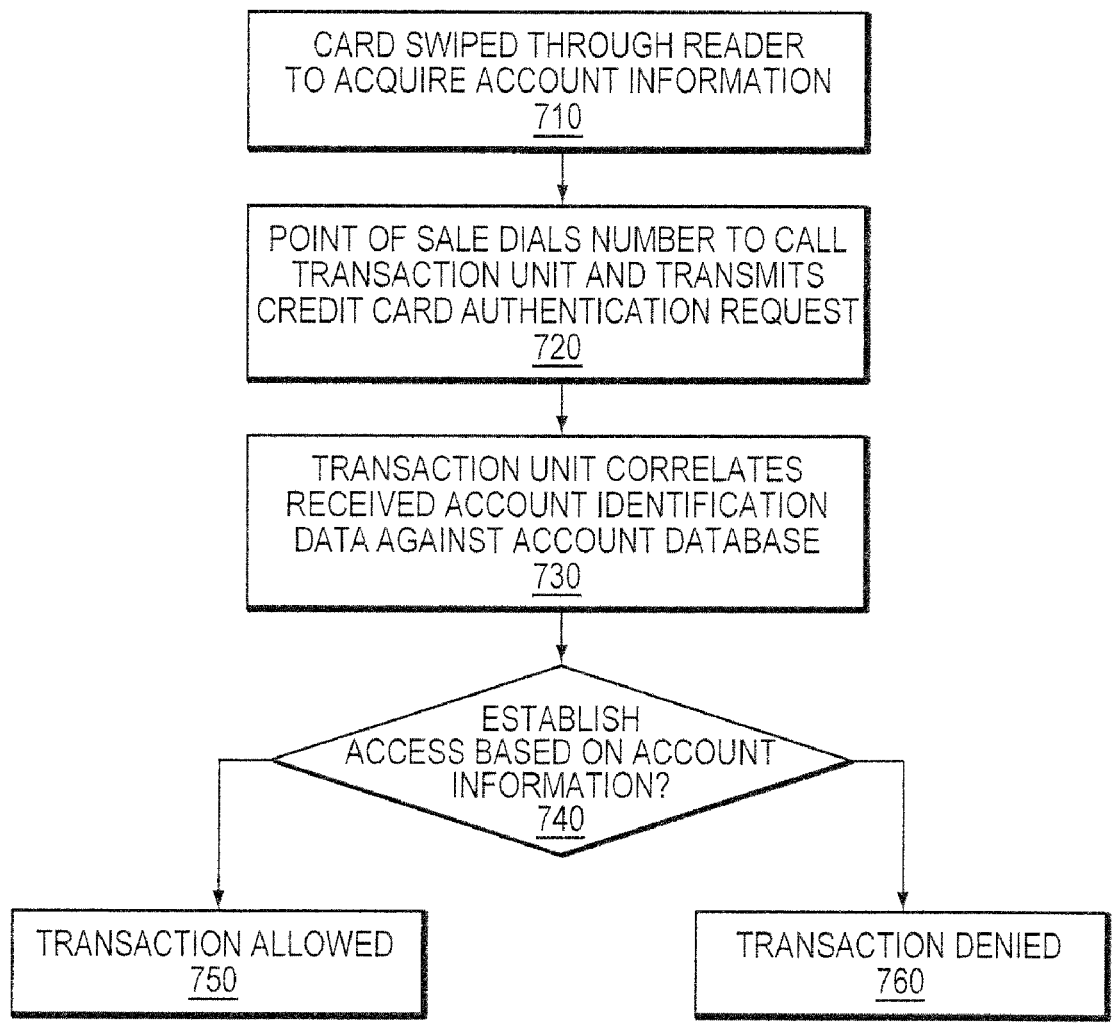
FIG. 7 is a flowchart illustrating an embodiment of the present invention.

FIG. 7 illustrates an exemplary transaction flow according to principles of the present invention. An authorized consumer card holder (account holder) seeking to make a purchase provides a vendor with a card. At step 710, the card is swiped though a reader, such as optical scanner 650 of FIG. 6 to acquire account identification data that corresponding to a combination of a plurality of colors. That is, the invention card holds the account identification data in a color encoded manner corresponding to a combination of a plurality of colors. At step 720, the point of sale vendor dials a number to call the transaction unit and transmits the credit card authentication request, including the account information, through a network 610. At step 730, upon receiving a request for access to a transaction system, the transaction unit 620 of FIG. 6 may access the account database 625 and correlate the account identification data from the request with data in account database 625. At step 740, the transaction unit 620 determines whether to establish access based on the correlation of the request against account database 625. Depending on any number of criteria determined by a transactional system (e.g. account verification, credit limits, account status, stolen card status, etc.), the transaction will be allowed 750, or denied 760.

As discussed above, the request for a transaction may occur through any number of account acquisition units at a point of sale. For example, a telephone 640 may acquire the account identification data from a user and transmit the transaction request through a public switched telephone network (PSTN) 642 through a switch 644 to the network 610. In terms of online, phone or mail transactions, the user simply fills in the account number query by reading the printed names of the colors off of the card in sequence, such as, "My account number is hazel, violet, khaki, orange, magenta, blue, lime and peach."

Figure 8:
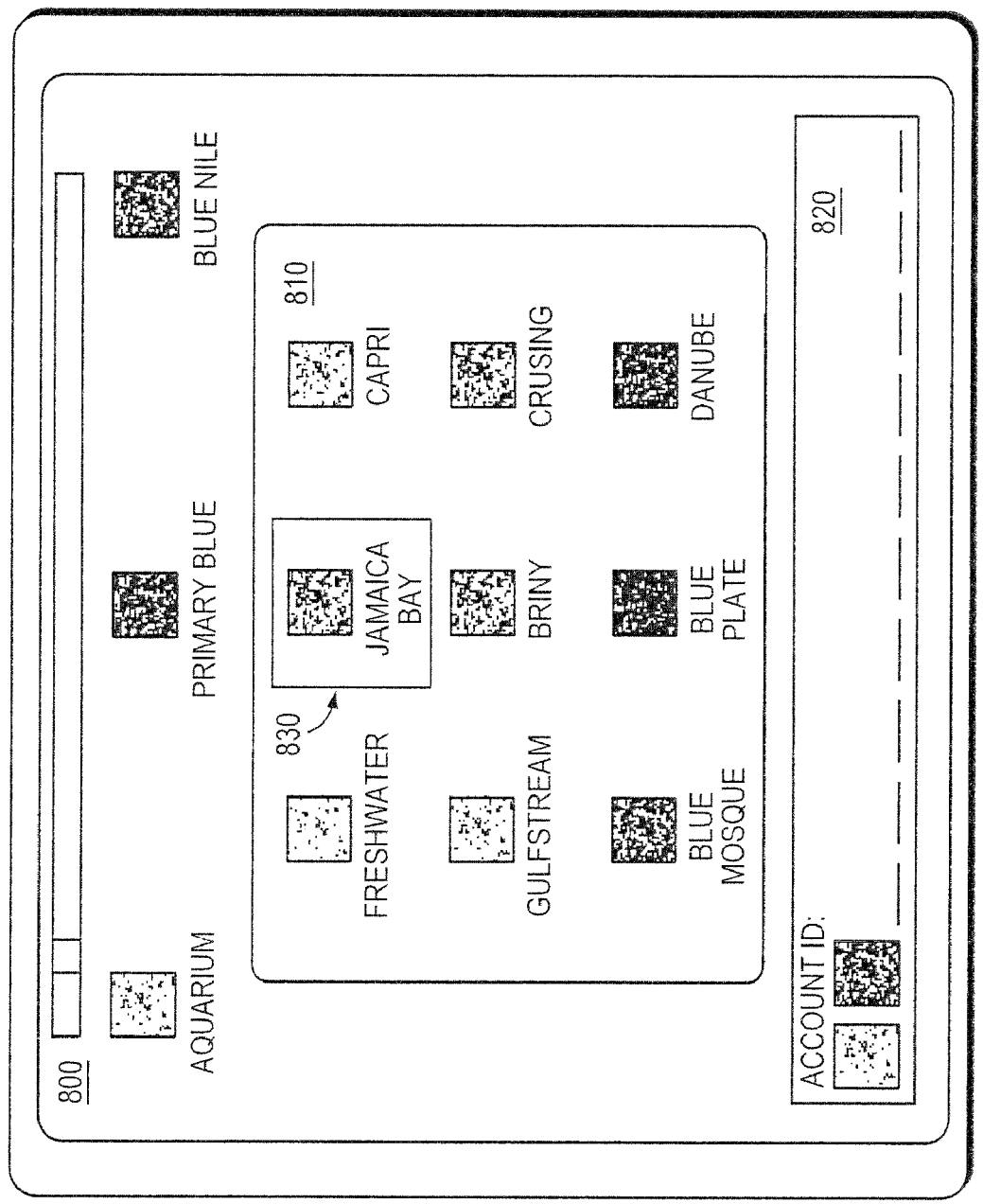
FIG. 8 is an illustration of the digital color visualizer that may be used at visual acquisition unit according to principles of the present invention.

FIG. 8 illustrates a graphical user interface 800 that may be used in connection with on-line transactions from a personal computer 630 of FIG. 6, or from any acquisition unit that may employ a graphical user interface (not shown in FIG. 6) such as an automated teller machine ("ATM"). Colors may be selected from a special menu 810 that lists all the colors sorted among primary to secondary to tertiary colors with an intuitive interface. The interface may provide for easy descent from primary to tertiary colors, and easy ascent from tertiary to primary colors. As a user scrolls through the organized color options (possible user selectable color candidates) may select 830 the colors corresponding to his own account identification. In the user interface 800 of FIG. 8, a separate frame or work area 820 for account identification shows the user the color selections the user has made. While using the GUI interface on-line or at an ATM, a built in memory to the color selection defines a color palette selection interface that can allow users to leave 'bread crumbs' to locate their color combinations in the future more fluidly and store and deploy their color account codes with a single click. Colors can also be located alphabetically, and/or with a Braille interface for visually impaired people or for people who simply prefer to locate their account numbers in this manner.

Those of ordinary skill in the art should recognize that methods involved in a method and system for providing coded access to a system may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer useable/readable medium can also include a communications or transmission medium, such as electromagnetic signals propagating on a computer network, a bus or a communications link, either optical, wired, or wireless, carrying program code segments as digital or analog data signals. The program code enables and supports computer implementation of the operations described in FIG. 7 or other embodiments.

While this invention has been particularly shown and described with references to example embodiments thereof, it will be understood by those skilled in the art that various changes in form and details may be made therein without departing from the scope of the invention encompassed by the appended claims. For example, as used herein "color" or "color array" may include grayscale elements.

What is claimed is:

1. A method, comprising:
  receiving account identification data corresponding to a twelve color array of colors;
  correlating the account identification data against an account database to evaluate corresponding account information; and
  controlling access to a transactional system based on the evaluated account information.

2. The method of claim 1, wherein the account identification data comprises audio data stored on an identification card.

3. The method of claim 1, wherein the transactional system comprises a credit card system, a debit card system, or a banking system.

4. The method of claim 1, wherein the twelve color array of colors is selected from a range of multiple thousands to multiple millions of individual colors.

5. A method, comprising:
  acquiring account identification data comprising a series of sounds, wherein the account identification data corresponds to a combination of colors appearing on an account card, and wherein the series of sounds corresponds to the combination of colors;
  comparing the account identification data against an account database to confirm a corresponding account; and
  controlling access to the corresponding account based on the account identification data.

6. The method of claim 5, wherein each sound of the series of sounds corresponds to a color of the combination of colors.

7. The method of claim 5, wherein the series of sounds comprises voice data stored on the account card.

8. The method of claim 5, wherein the series of sounds comprises audio tones stored on the account card.

9. The method of claim 5, further comprising optically scanning the combination of colors from the account card.

10. The method of claim 9, further comprising converting the optically scanned combination of colors into the series of sounds.

11. The method of claim 5, further comprising receiving color selection information from a user interface, wherein the color selection corresponds to the combination of colors.

12. The method of claim 11, wherein the user interface comprises a graphical user interface.

13. The method of claim 11, wherein the user interface comprises a voice activated interface.

14. A tangible computer readable medium having stored therein computer executable instructions that, in response to being executed by a computing device, cause the computing device to perform operations comprising:
identifying account identification data corresponding to a plurality of colors appearing on an identification card, wherein the plurality of colors uniquely identify an account corresponding to the account identification data;
correlating the account identification data against an account database to confirm the corresponding account; and
controlling access to the corresponding account based on the account identification data.

15. The computer readable medium of claim 14, further comprising acquiring the account identification data as a series of sounds stored on the identification card, wherein the series of sounds uniquely identifies the account.

16. An identification card comprising:
account identification data, wherein the account identification data comprises a number of colors that appears on the identification card, wherein the number of colors corresponds to a number of characters associated with an account, and wherein the account identification data uniquely identifies the account in an account database to validate a transaction associated with the identification card.

17. The identification card of claim 16, further comprising audio data stored on the identification card as machine readable information, wherein the machine readable information also uniquely identifies the account.

18. The identification card of claim 16, wherein the characters comprise an account number that uniquely identifies the account.

19. A system for conducting a transaction comprising:
means for acquiring account identification data, wherein the account identification data corresponds to a number of colors appearing on an account card, and wherein the number of colors equals a number of characters associated with an account;
means for transmitting the account identification data;
means for receiving confirmation that the account identification data correlates to the account; and
means for receiving authorization to complete the transaction.

20. The system of claim 19, further comprising means for storing the account identification data as audio data on the account card, wherein either of the stored audio data or the number of colors uniquely identifies the account.

21. The system of claim 19, wherein the characters comprise a number of digits that uniquely identifies the account.

22. A system, comprising:
an acquisition unit configured to acquire account identification data during a transaction, wherein the account identification data is stored on a card as audio data, wherein the account identification data corresponds to a plurality of colors displayed on the card, and wherein the acquisition unit is configured to transmit the account identification data;
an account database configured to store account information; and
a transaction unit configured to correlate the account identification data against the account database to confirm the corresponding account information in the account database, and wherein the transaction unit is further configured to authorize completion of the transaction.

23. The system of claim 22, further comprising an audio acquisition device configured to process the account identification data, wherein the account identification data comprises voice data.

24. The system of claim 22, further comprising an optical scanner configured to acquire the account identification data by identifying the plurality of colors on the card, wherein the plurality of colors uniquely identify an account associated with the account information in the account database.

25. The system of claim 24, further comprising a look up table that correlates the audio data to the plurality of colors, wherein the acquisition unit is further configured to convert the plurality of colors acquired from the optical scanner into the audio data.

26. The system of claim 22, further comprising a conversion look up table that associates the audio data with the plurality of colors, wherein the transaction unit is further configured to convert the audio data into the plurality of colors using the conversion look up table.

27. A method, comprising:
receiving audio information corresponding to a plurality of colors, wherein the plurality of colors are displayed on an identification card;
correlating the audio information against an account database to confirm corresponding account information; and
controlling access to a transactional system based on the account information.

28. The method of claim 27, wherein individual labels for the plurality of colors are provided on the identification card.

29. The method of claim 28, wherein the individual labels provide a written description of the plurality of colors.

30. The method of claim 27, wherein the audio information is stored on a magnetic strip of the identification card.

* * * * *